US008392503B2

(12) United States Patent
Kuhlke et al.

(10) Patent No.: US 8,392,503 B2
(45) Date of Patent: Mar. 5, 2013

(54) REPORTING PARTICIPANT ATTENTION LEVEL TO PRESENTER DURING A WEB-BASED RICH-MEDIA CONFERENCE

(75) Inventors: Matthew Kuhlke, San Francisco, CA (US); Fadi Ramzi Jabbour, Sunnyvale, CA (US); David C. Lee, Sunnyvale, CA (US); Eric H. Lee, San Jose, CA (US); Glenn Tay Inn, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 11/812,452

(22) Filed: Jun. 19, 2007

(65) Prior Publication Data

US 2008/0320082 A1  Dec. 25, 2008

(51) Int. Cl.
*G06F 15/16* (2006.01)
*G06F 3/00* (2006.01)
*H04N 7/14* (2006.01)
(52) U.S. Cl. ........ 709/204; 709/205; 709/206; 715/753; 348/14.01; 348/14.08
(58) Field of Classification Search .................. 709/205, 709/223, 224, 204, 206; 715/753; 348/14.01, 348/14.08
See application file for complete search history.

(56) References Cited

U.S. PATENT DOCUMENTS

| 7,356,137 | B1 * | 4/2008 | Burg et al. .............. 379/211.01 |
| 2005/0099492 | A1 * | 5/2005 | Orr ............................. 348/14.08 |
| 2006/0206560 | A1 * | 9/2006 | Kanada ........................ 709/201 |
| 2007/0244969 | A1 * | 10/2007 | Knight et al. ................ 709/204 |
| 2008/0034085 | A1 * | 2/2008 | Chawla et al. ............... 709/224 |
| 2008/0049922 | A1 * | 2/2008 | Karniely ................. 379/205.01 |

OTHER PUBLICATIONS

U.S. Appl. No. 10/059,675, filed Jan. 29, 2002, by Firestone.
U.S. Appl. No. 11/643,606, filed Dec. 20, 2006, by Khouri et al.
Ou et al., "Combining Audio and Video to Predict Helpers' Focus of Attention in Multiparty Remote Collaboration on Physical Tasks", International Conference on Multimodal Interfaces (ICMI) 2006, Banff, Canada, Nov. 2-4, 2006, pp. 217-224.
"Cisco Unified MeetingPlace 6.0 Web Conferencing", Data Sheet, Copyright 1992-2007, Cisco Systems, Inc., pp. 1-9.
"Cisco Unified MeetingPlace 6.0", Data Sheet, Copyright 1992-2007, Cisco Systems, Inc., pp. 1-12.
"Cisco Unified Presence 6.0", Data Sheet, Copyright 1992-2007, Cisco Systems, Inc., pp. 1-8.
"Cisco Unified Presence Server 1.0", Data Sheet, Copyright 1992-2007, Cisco Systems, Inc., pp. 1-7.
Augmented Multi-Party Interaction, State-of-the-art overview, "Recognition of Attentional Cues in Meetings", Jan. 2006, Information Society Technologies, pp. 1-9.

* cited by examiner

*Primary Examiner* — Peter Shaw
(74) *Attorney, Agent, or Firm* — Leon R. Turkevich

(57) ABSTRACT

In one embodiment, a method comprises establishing, by an IP-based meeting server via an IP network, a web-based media conference between an identified meeting presenter having a web-enabled presenter client device and identified meeting participants each having at least one corresponding participating client device; receiving, by the IP-based meeting server, monitoring data for each of the identified meeting participants, the monitoring data including, for each identified meeting participant, a detected interaction by the corresponding identified meeting participant with the corresponding participant client device; generating, by the IP-based meeting server, an aggregate attention metric identifying an aggregate focus of attention by the identified meeting participants, based on the received monitoring data; and outputting, by the IP-based meeting server, the aggregate attention metric for display by the web-enabled presenter client device of the identified meeting presenter.

18 Claims, 7 Drawing Sheets

REPORTING PARTICIPANT ATTENTION LEVEL TO PRESENTER DURING A WEB-BASED RICH-MEDIA CONFERENCE

TECHNICAL FIELD

The present disclosure generally relates to determining attention level of meeting participants of a web-based rich-media conference.

BACKGROUND

Lecturers and presenters are continually looking for improved techniques for maximizing the efficiency in conveying information to their audiences. For classical style meetings, where all participants are physically co-located and can see each other, lecturers and presenters historically have relied on intuitive visual feedback to determine an overall audience interest (for example based on visual cues such as eye contact, body movement), to enable a presenter to determine whether the current presentation commands an acceptable level of audience interest, or whether an alternative presentation technique is required to improve audience interest. Such visual feedback also may be used by a presenter during the actual presentation to change his or her presentation technique if the overall audience interest is faltering, or to determine whether the audience needs a break; such visual feedback also may be used by the presenter, in combination with written feedback, to improve the presentation for future audiences.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
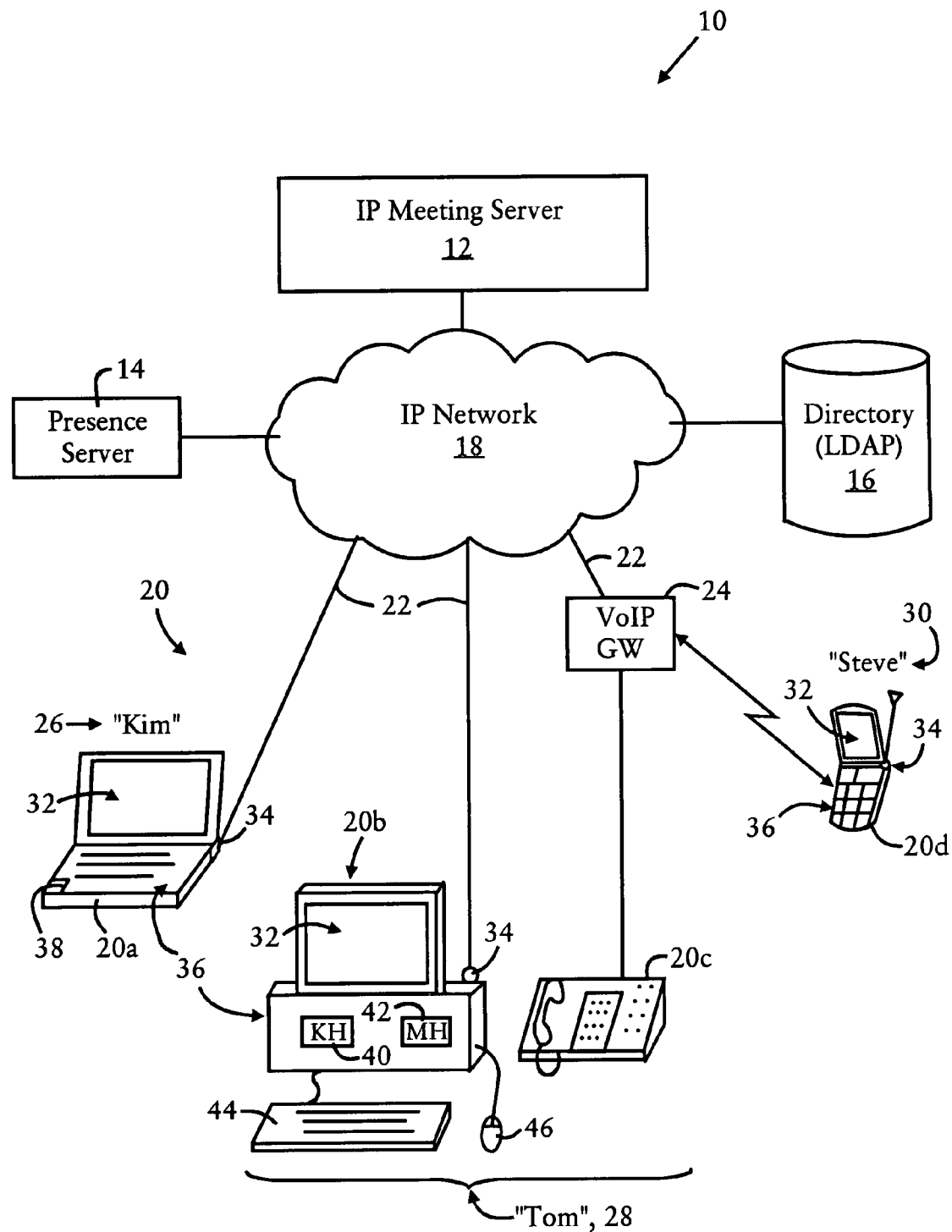
FIG. 1 illustrates an example system having a web-based meeting system for reporting participant attention level to a presenter during a web-based rich media conference, according to an example embodiment.

In one embodiment, a method comprises establishing, by an IP-based meeting server via an IP network, a web-based media conference between an identified meeting presenter having a web-enabled presenter client device and identified meeting participants each having at least one corresponding participating client device; receiving, by the IP-based meeting server, monitoring data for each of the identified meeting participants, the monitoring data including, for each identified meeting participant, a detected interaction by the corresponding identified meeting participant with the corresponding participant client device; generating, by the IP-based meeting server, an aggregate attention metric identifying an aggregate focus of attention by the identified meeting participants, based on the received monitoring data; and outputting, by the IP-based meeting server, the aggregate attention metric for display by the web-enabled presenter client device of the identified meeting presenter.

In another embodiment, an apparatus comprises a web conference interface circuit and a calculation circuit. The web conference interface circuit is configured for establishing a web-based media conference between an identified meeting presenter having a web-enabled presenter client device and identified meeting participants each having at least one corresponding participating client device. The web conference interface circuit also is configured for receiving monitoring data for each of the identified meeting participants, the monitoring data including, for each identified meeting participant, a detected interaction by the corresponding identified meeting participant with the corresponding participant client device. The calculation circuit is configured for calculating an aggregate attention metric identifying an aggregate focus of attention by the identified meeting participants, based on the received monitoring data, and the web conference interface circuit further is configured for outputting the aggregate attention metric for display by the web-enabled presenter client device of the identified meeting presenter.

In yet another embodiment, a method comprises initiating, by a web-enabled presenter client device via an IP network, a web-based media conference between a meeting presenter interacting with the web-enabled presenter client device and identified meeting participants each having at least one corresponding participating client device, based on the web-enabled web presenter client device establishing an IP connection with an IP-based meeting server that establishes respective IP connections with the respective participating client devices; supplying, by the web-enabled presenter client device, media data from the meeting presenter to the IP-based meeting server for distribution to the participating client devices during the web-based rich media conference; and displaying for the meeting presenter, by the web-enabled presenter client device, an aggregate attention metric received from the IP-based meeting server, the aggregate attention metric identifying an aggregate focus of attention by the identified meeting participants.

In another embodiment, an apparatus comprises an Internet Protocol (IP) interface circuit configured for establishing an IP connection with an IP-based meeting server; and a client interface circuit configured for initiating a web-based media conference between a meeting presenter interacting with the apparatus and identified meeting participants each having at least one corresponding participating client device, based on sending a request to the IP-based meeting server to establish respective IP connections with the respective participating client devices. The client interface circuit also is configured for supplying media data from the meeting presenter to the IP-based meeting server for distribution to the participating client devices during the web-based rich media conference, and displaying for the meeting presenter an aggregate attention metric received from the IP-based meeting server, the aggregate attention metric identifying an aggregate focus of attention by the identified meeting participants.

DETAILED DESCRIPTION

Particular embodiments enable a presenter to determine the attention level of meeting participants of a web-based media conference established by a unified media conference system; based on the unified media conference system receiving monitoring data for each of the identified meeting participants, and generating an aggregate attention metric that identifies an aggregate focus of attention by the identified meeting participants. The monitoring data for the identified meeting participants can be supplied either by the client devices used by the identified meeting participants (i.e., the participant client device), or by another server that is monitoring the participating client device, for example a presence server configured for monitoring a device state of the participating client device. In other words, the level of attention of individual meeting participants can be determined based on detecting and analyzing interactions between a meeting participant and his or her user interface devices.

The aggregate attention metric, generated by the unified media conference system based on the received monitoring data, can be supplied to the client device of the presenter to enable the meeting presenter to determine the overall attention level to the presentation. The unified media conference system also can generate participant focus of attention metrics for the respective identified meeting participants: the participant focus of attention metric for a given participant can be supplied to the presenter, for example in the case of a specific participant of interest, a random selection, or a complete list of the meeting participants and their respective attention levels, providing the presenter with enhanced feedback as to the attention by the meeting participants to the presentation.

Hence, the aggregate attention metric generated by the unified media conference system and supplied to the identified meeting presenter, as well as the respective participant focus of attention metrics, enable a presenter to accurately determine the effectiveness of his or her presentation with remote meeting participants, without the necessity of visual feedback from the remote meeting participants to the presenter. The display of the respective participant focus of attention metrics also can assist a presenter in identifying groups of meeting participants that have different levels of attention, for example a high-attention group, a moderate-attention group, and/or a low-attention group. Such information can assist the meeting presenter in identifying distracting elements adversely affecting the group of low-attention meeting participants, or can assist the meeting presenter in identifying the individuals of the high-attention meeting participants that are especially interested in the subject matter of the presentation.

The aggregate attention metric and/or the participant focus of attention metric for a given meeting participant also can be stored and compiled during the duration of the presentation, enabling the meeting presenter, the meeting participants, and/or supervisory personnel of either the meeting presenter or the participants to identify factors that affected the attention of the participants, including the effectiveness of the presentation by the meeting presenter.

FIG. 1 illustrates an example system 10 for reporting participant attention level to a presenter during a web-based rich media conference, according to an example embodiment. The system 10 can include at least one IP-based meeting server 12, a presence server 14, a corporate directory 16 that includes user profile information, and an Internet Protocol (IP) network 18 that enables the IP-based meeting server 12 to establish IP-based connections 22 with client devices 20, either directly or via a media gateway 24 such as a Voice over IP gateway 24.

For example, assume that the user 26 ("Kim") of the client device 20a is a meeting presenter that wishes to provide a web-based rich-media conference for the meeting participants "Tom" 28 and "Steve" 30. The client device 20a and the client device 20b each include an IP-based network interface circuit 34 configured for establishing an IP connection with the IP meeting server 12 via the IP network 18, and a client interface circuit 36 that includes interface circuitry such as user keyboard, a user selection device (e.g., mouse, touchpad, pointing device, etc.), user display or monitor, and a speaker and microphone 38, and associated input detection and driver circuitry, illustrated with respect to device 20a as integrated within a laptop computer. The client device 20d also can include an IP based network interface circuit 34, implemented for example as an IP interface circuit that can use a prescribed wireless access protocol, for example an IEEE 802.11 or IEEE 802.16 based protocol or a Code Division Multiple Access (CDMA) or the Global System for Mobile TDMA (GSM) protocol, and a client interface circuit 36 including cellphone multifunctional keys, associated circuitry, and a display that includes circuitry for providing a web browser, for example a Mobile Web 2.0 compliant web browser. The user 26 can request the IP meeting server 12, via the corresponding user device 20a, to establishing a web-based rich-media conference for the meeting participants 28 and 30, causing the IP meeting server 12 to establish the IP connections 22 with the respective client devices 20b, 20c, and 20d.

Upon establishing the IP connections 22, the IP meeting server 12 can provide a web-based interface 32 on the web-enabled user devices 20a, 20b, and 20d, each of which can execute a web-based browser for display of the web-based interface 32. The web-based interface 32 can include video displays, simultaneous display of user applications executed on the presenter client device 20a on the participant client devices 20b and 20d, and user interaction controls such as audio interaction controls (e.g., mute, increase volume, decrease volume, etc.), and meeting conference control inputs such as placing meeting on hold, leave a meeting, or reconnect with the meeting. Each of the user interaction controls within the web-based interface 32 can be detected by the meeting server 12, enabling the IP meeting server 12 to update the information displayed on the corresponding user device.

The IP meeting server 12 also can join multiple user devices 20b, 20c of a given meeting participant 28 to the media conference, for example based on establishing respective connections 22 with the user devices 20b and 20c, and associating the user devices 20b and 20c with the same identified meeting participant 28. Hence, the IP meeting server 12 can detect user inputs to the user devices 20b and 20c by the meeting participant 28 to determine the relative attention of the user 28 to the meeting, described in further detail below.

The meeting server 12 is configured for detecting user inputs based on monitoring circuitry (e.g., event listeners) within the user devices 20, illustrated for example in the device 20b as a keyboard hack (KH) circuit 40 for detecting user inputs to a keyboard 44 and mouse hack (MH) circuit 42 configured for detecting user inputs to a user selection device (e.g., mouse) 46. Hence, monitoring circuitry (e.g., 40, 42) in each of the web-enabled user devices 20a, 20b, and 20d supply detected user inputs to the IP meeting server 12, enabling the IP meeting server 12 to receive monitoring data in the form of detected user interaction inputs detected by the monitoring circuitry (e.g., 40, 42) in the respective web-enabled client devices 20.

The meeting server 12 also can receive monitoring data from the presence server 14, for example in the case of a client device 20c that does not have monitoring circuitry configured for supplying detected user inputs to the meeting server 12; rather, user devices 20c utilizing presence-based services can supply presence-based data to the presence server 14, for example identifying whether a given user is on a given telephone call, where the presence server 14 can identify the specific phone call that is active on the user device 20c. As recognized in the art, the presence server 14 also can be configured for controlling presence-based applications on the web-enabled client devices 20a, 20b, and 20d, for example instant messaging, or location tracking or monitoring (e.g., location tracking in the cellphone 20d); the presence server 14 also can detect locations of individuals that wear a badge that supports location tracking.

Hence, the IP-based meeting server 12 can receive monitoring data, identifying a detected interaction by a meeting participant (e.g., 26, 28, or 30) with a corresponding participant client device (e.g., 20a, 20b, or 20d) from the corresponding participant client device, or alternately from another server such as the presence server 14 or the Voice over IP gateway 24. The IP-based meeting server 12 can generate attention metrics based on the received monitoring data, including an aggregate attention metric identifying the aggregate focus of attention by all the identified meeting participants, or a participant focus of attention metric for each corresponding meeting participant, and output the generated attention metrics to the meeting presenter 26.

Figure 2:
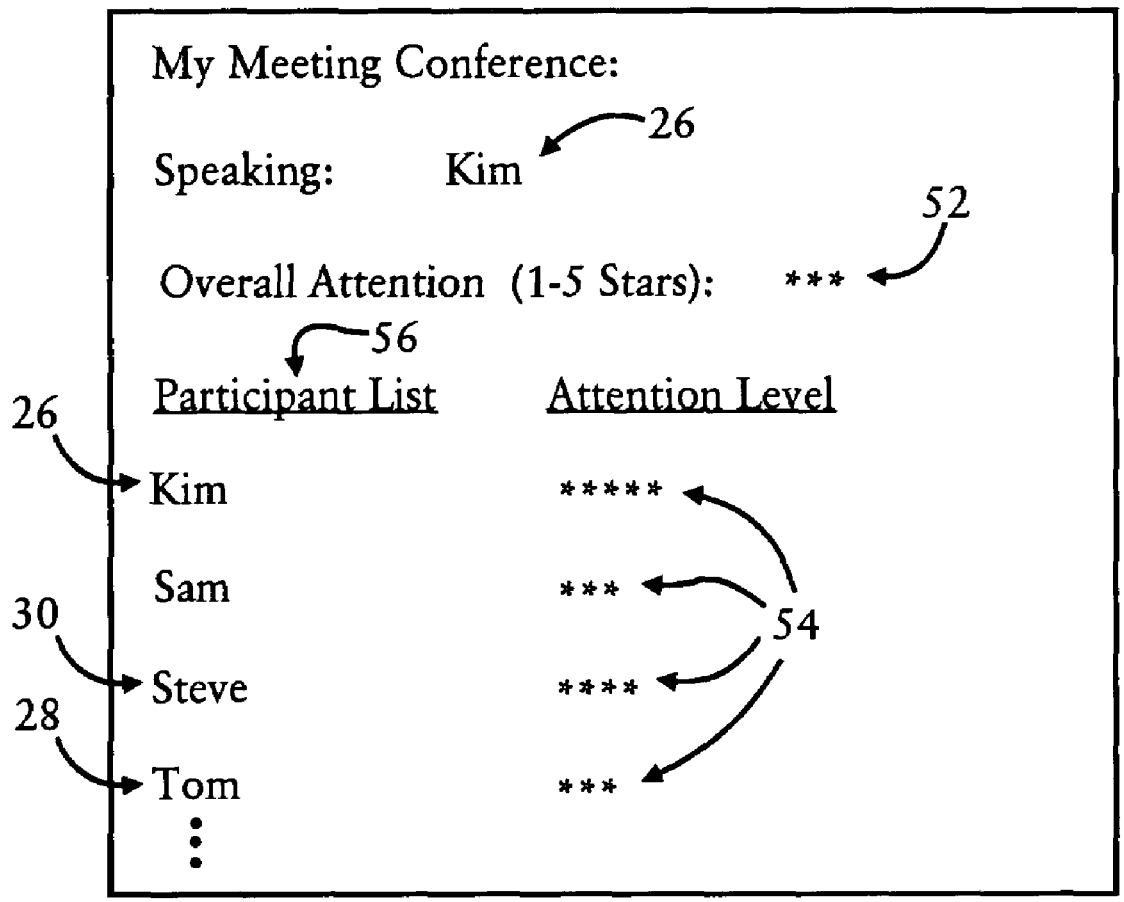
FIG. 2 illustrates an example focus of attention report supplied to the meeting presenter of FIG. 1 during an ongoing web-based rich media conference, according to an example embodiment.

FIG. 2 illustrates an example focus of attention report 50 generated by the meeting server 12 and supplied to the meeting presenter 26 of FIG. 1 during an ongoing web-based rich media conference, according to an example embodiment. The IP-based meeting server 12 can supply the aggregate attention metric 52 to the identified meeting presenter 26 for display on the corresponding web-based interface 32, enabling the meeting presenter 26 to determine the overall level of attention to the presentation. The IP-based meeting server 12 also can supply the participant focus of attention metric 54 for any one of the meeting participants, or all the meeting participants, in order to identify the attention level of the corresponding identified meeting participant. Hence, the meeting presenter 26 can receive the focus of attention report 50 that enables the meeting presenter 26 to determine in real time during the presentation the relative attention level 54 of each of the meeting participants (e.g., 28, 30), as well as the overall attention level 52, providing immediate feedback as to the effectiveness of the presentation, even without the presence of video based equipment that would enable the meeting presenter 26 to view the other meeting participants, and vice versa.

Figure 3:
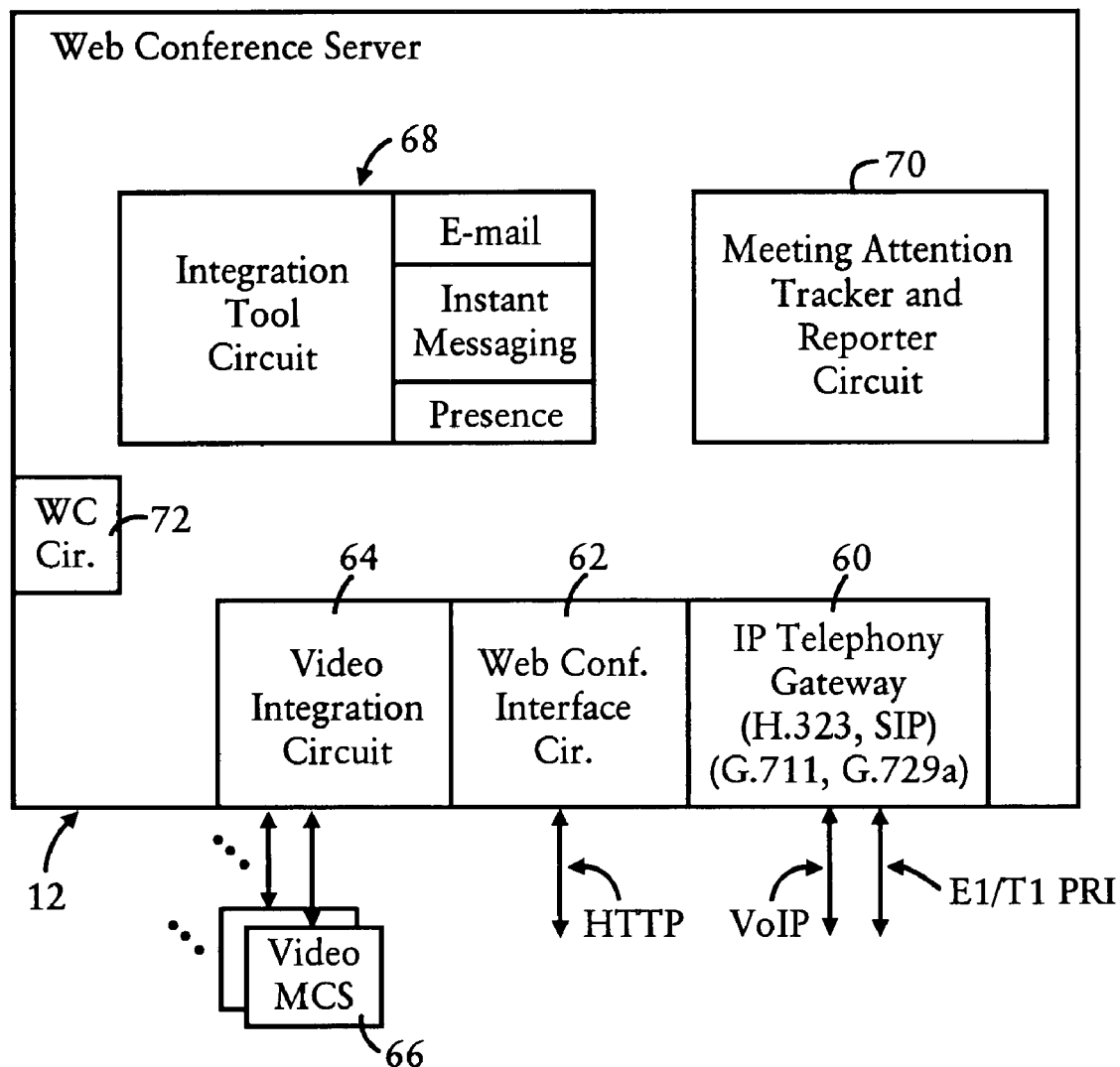
FIG. 3 illustrates an example web conference server from the system of FIG. 1, according to an example embodiment.

FIG. 3 illustrates an example web conference server 12 from the system of FIG. 1, according to an example embodiment. The web conference server 12 can be implemented, for example, using the commercially available Cisco Unified MeetingPlace 6.0 that can include the Cisco Unified MeetingPlace 8100 Audio Server, implemented on a media convergence server such as the Cisco 7800 Series Media Convergence Server, all available from Cisco Systems, San Jose, Calif. The web conference server 12 also can be implemented using some other IP-based meeting server. As illustrated in FIG. 3, the web conference server 12 can include an IP telephony gateway (e.g., the commercially available Cisco MeetingPlace IP Gateway from Cisco Systems) 60, a web conference interface circuit (e.g., the commercially available Cisco Unified MeetingPlace Conference User Interface from Cisco Systems) 62, a video integration circuit (e.g., the commercially available Cisco Unified MeetingPlace and Video Integration from Cisco Systems) 64 that interfaces with at least one video media convergence server (e.g., the commercially available Cisco Unified Videoconferencing 3500 Series Multipoint Control Unit (MCU) from Cisco Systems) 66, an integration tool circuit (e.g., the commercially available Cisco Unified MeetingPlace Integrations from Cisco Systems) 68, and a meeting attention tracker and reporter circuit 70. The web conference server 12 also can include a web conferencing (WC) circuit (e.g., the commercially available Cisco Unified MeetingPlace Web Conferencing Software from Cisco Systems) 72, enabling communication between multiple distributed media convergence servers. Hence, the meeting server 12 can be implemented as a single server, or a distributed server network that communicate via web conferencing circuits 72 installed on each of the distributed servers, where any one of the circuits 60, 62, 64, 68, and 70 can be installed on any one of the distributed servers.

The interface circuits 60, 62, 64, and 68, as well as the web conference circuit 72, also can be configured for communicating with the presence server 14, implemented for example using the commercially available Cisco Unified Presence Server 1.0 from Cisco Systems and executed by a media convergence server such as the commercially available Cisco Media Convergence Server (MCS) series 7285, 7835, or 7845 from Cisco Systems.

Any of the disclosed circuits of the meeting server 12 (including the IP gateway 60, the conference user interface circuit 62, the video interface circuit 64, the integration circuit 68, the meeting tracker and reporter circuit 70, or the WC 72), or the client devices 20 (including the IP interface circuit 34 or the client interface circuit 36) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal memory causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuits in the devices 20 or the server 12 can be implemented as a memory, for example an EPROM, a DRAM, etc.

Further, any reference to "outputting a message", "outputting a packet", or "outputting data" can be implemented based on creating the message/packet in the form of a data structure and storing that data structure in a tangible memory medium in the disclosed apparatus (e.g., in a transmit buffer), and electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message", "receiving a packet", or "receiving data" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 4:
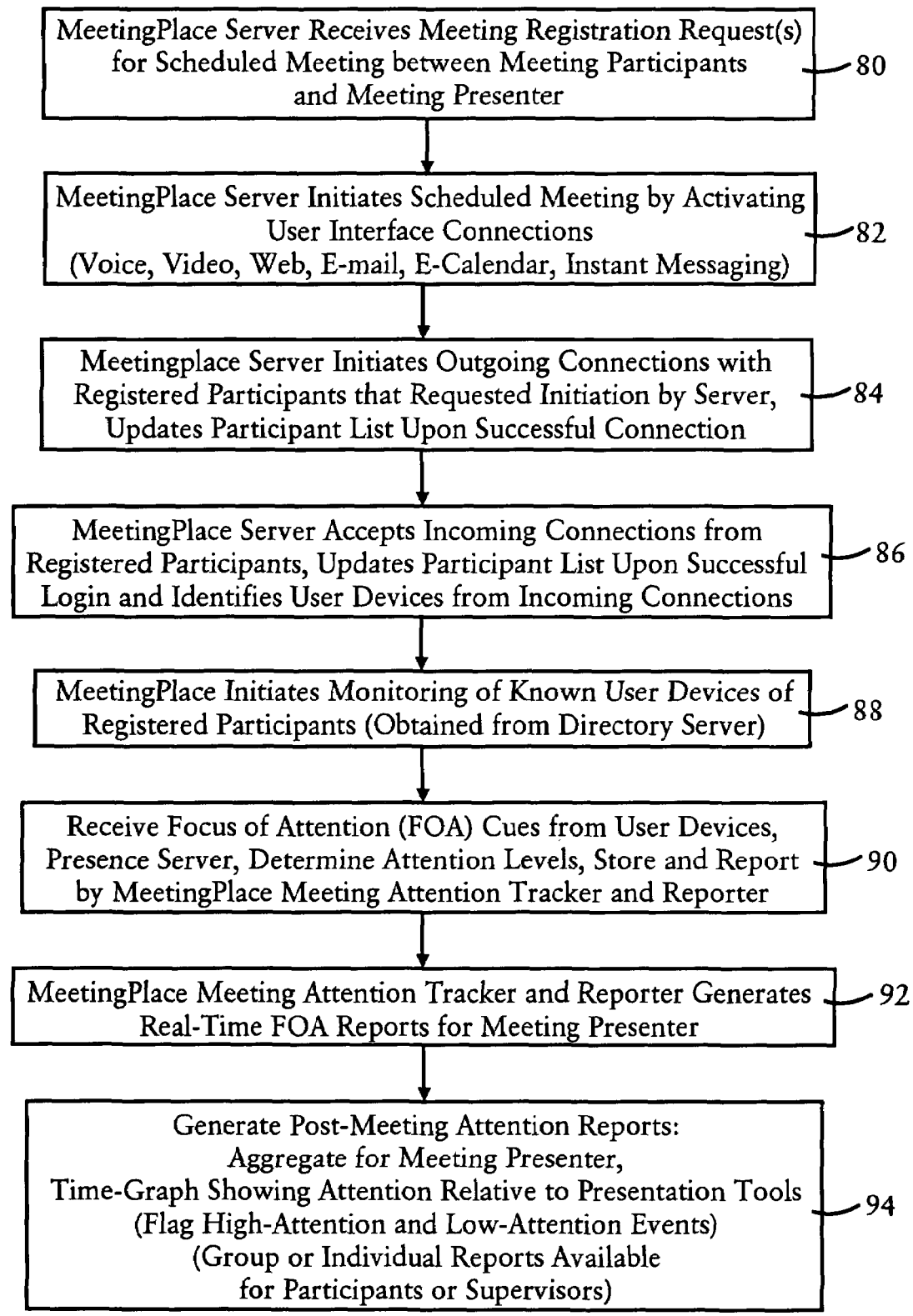
FIG. 4 illustrates an example method by the web-based meeting system of FIG. 1 of determining and reporting participant attention level during a web-based rich media conference, according to an example embodiment.
Figure 5:
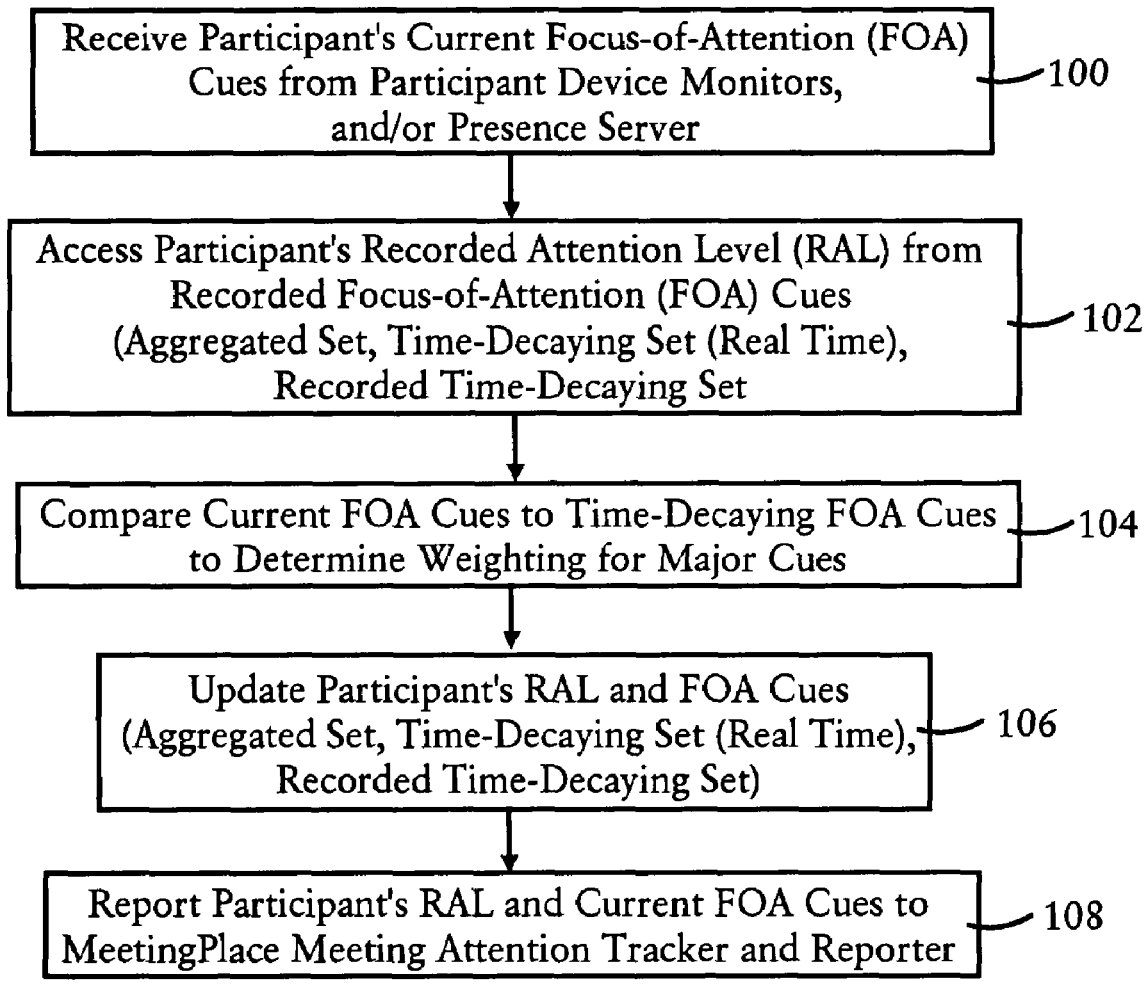
FIG. 5 illustrates an example method by the web-based meeting system of FIG. 1 of determining individual meeting participant attention level according to an example embodiment.
Figure 6:
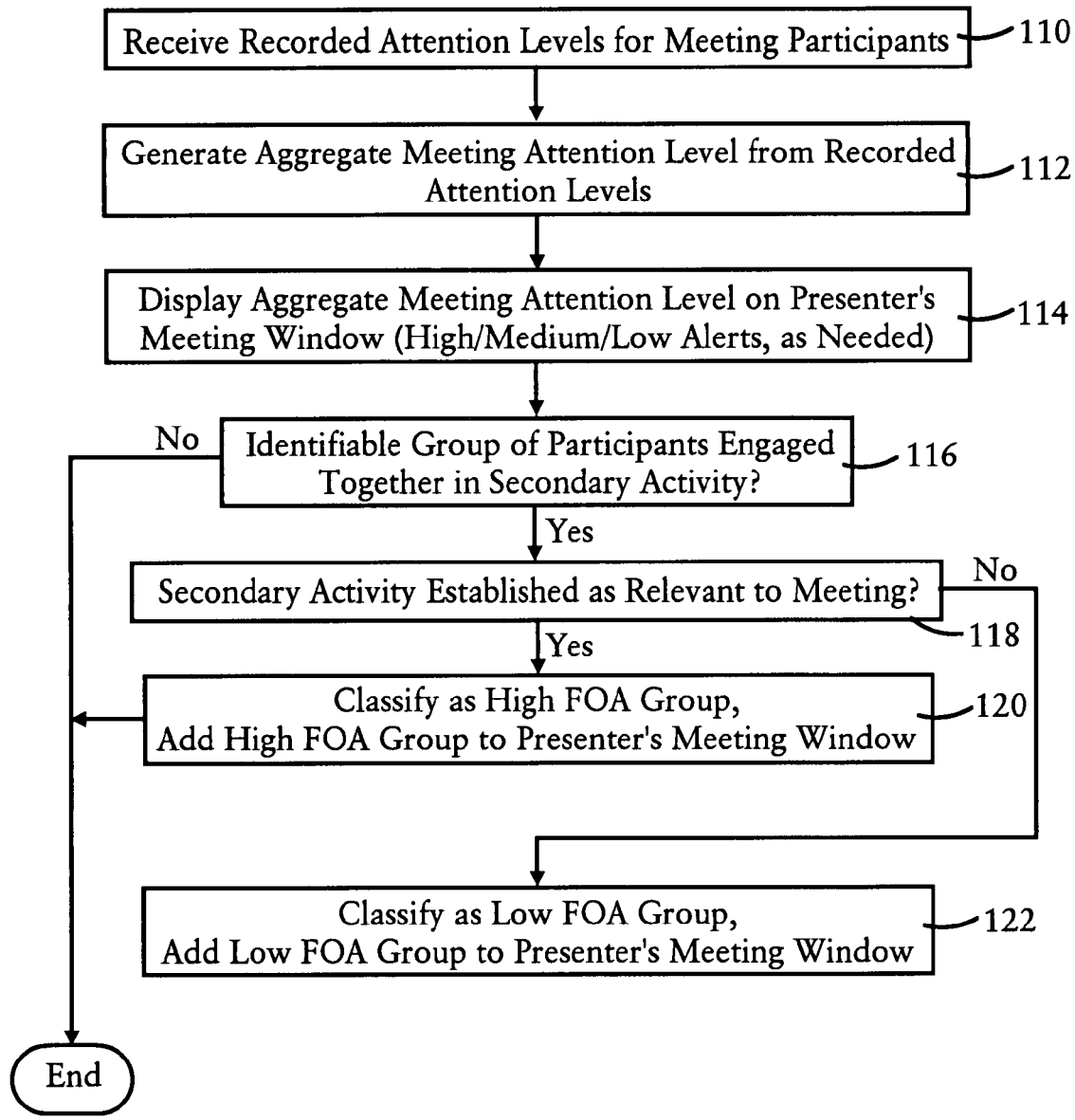
FIG. 6 illustrates an example method by the web-based meeting system of FIG. 1 of determining an aggregate participant attention level, according to an example embodiment.

FIG. 4 illustrates an example method by the web-based meeting system of FIG. 1 of determining and reporting participant attention level during a web-based rich media conference, according to an example embodiment. FIG. 5 illustrates an example method by the web-based meeting system of FIG. 1 of determining individual meeting participant attention level according to an example embodiment. FIG. 6 illustrates an example method by the web-based meeting system of FIG. 1 of determining an aggregate participant attention level, according to an example embodiment.

The steps described in FIG. 4, 5, or 6 can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The method begins in step 80, where the meeting server 12 receives a meeting registration request for a scheduled meeting between the meeting participants (e.g., 28, 30, etc.) and the meeting presenter 26. The meeting registration request can be sent by any one of the attendees 26, 28, or 30 of the meeting, or by another individual, for example a manager or secretary scheduling a meeting, and can be stored by the web conferencing circuit 72 for execution at the scheduled time.

The web conferencing circuit 72 initiates in step 82 the scheduled meeting by activating the appropriate user interface connections via the IP gateway 60, the conference user interface 62, the video interface circuit 64, or the integration tools 68, for example based on user preferences specified either in the initial meeting registration request or within the user preferences specified in the corporate directory 16. The interface circuits 60, 62, 64 and 68 can initiate in step 84 the appropriate connections to the destination user devices, for example based on the conference user interface 62 initiating an ActiveX connection with a web browser, the IP gateway 60 initiating a Voice over IP telephone call, the video interface 64 initiating a video call, or the integration circuit 60 sending an e-mail message, or instant message, or paging message, etc. to the appropriate messaging client. The web conference user interface 62 can establish the web-based interface 32 on the client devices 20 using, for example, ActiveX controls or WebEx services, commercially available on the World Wide Web at the website address "webex.com". Upon successful connection with the registered participants, the web conferencing circuit 72 updates the participant list 56 and updates each of the web-based interfaces 32, as illustrated in FIG. 2.

The web conferencing circuit 72 also can accept incoming connections in step 86 from registered participants, for example incoming calls received by any one of the interface circuits 60, 62, 64, or 68. In response to the valid login by the registered participants on the incoming connections, the web conferencing circuit 72 updates the participant list 56 for the incoming connections.

The web conferencing circuit 72 also initiates monitoring of the known user devices of the registered participants in step 88, for example based on sending a function call to the monitoring circuits (e.g., 40, 42) as identified in the user profile in the user directory 16 or based on sending or receiving presence information from the presence server 14.

The web conferencing circuit 72 receives in step 90 monitoring data for each of the identified meeting participants, including detected interactions by the corresponding identified meeting participant with a corresponding client device 20, detected either locally by a detection circuit (e.g., 40 or 42), or remotely by either the presence server 14 or another server such as the Voice over IP gateway 24.

Figure 7:
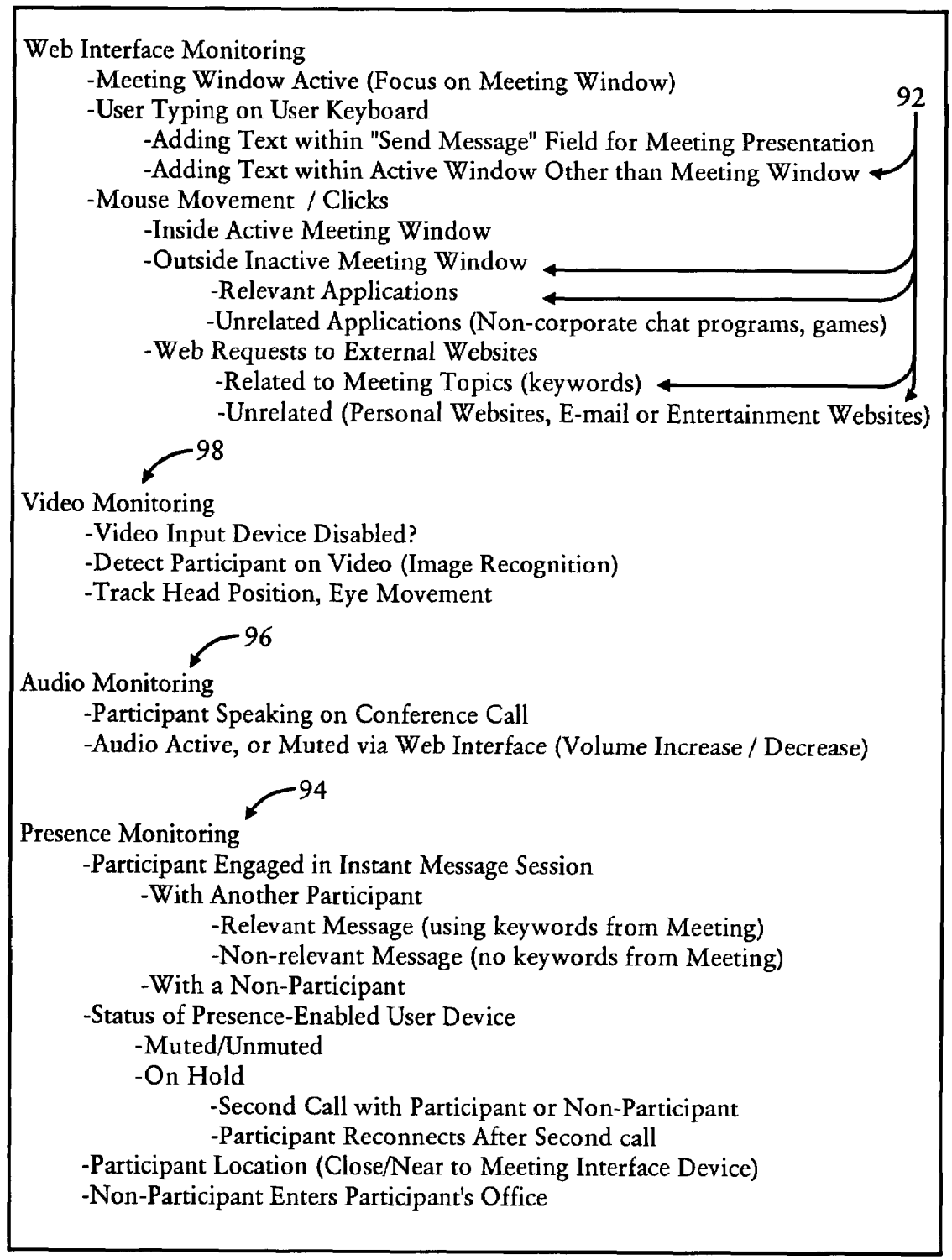
FIG. 7 illustrates example metrics that can be received by the web-based meeting system of FIG. 1 for use in generating individual and aggregate attention metrics, according to an example embodiment.

FIG. 7 illustrates an example monitoring data that can be received by the web conferencing circuit 72 for detecting interaction by a meeting participant with his or her client device 20. For example, the web conferencing circuit 72 can detect user inputs to the web conference interface circuit 62 that are supplied via the user web-based interface 32 as part of the web-based rich-media conference, for example text input, user interaction controls, and speech text that can be interpreted by speech recognition; however, the local client monitoring circuits (e.g., 40 or 42) also can supply detected inputs 92 that are outside the web-based interface 32 to the web conference circuit 72, enabling the web conference circuit 72 to detect user activity that is not input within the web-based interface 32 (e.g., whether the participant 28 is web browsing for relevant information or playing web games on an unauthorized web site).

As illustrated in FIG. 7, the web conferencing circuit 72 also can receive presence monitoring information 94 from the presence server 14, including whether the participant is engaged in an instant messaging session (with whom, the text of the messages), the status of a presence-enabled user device 20c, for example whether the device 20c is muted or unmuted, whether the conference call associated with the web-based rich media conference in the web-based interface 32 is the active call or on hold, and whether the participant reconnects with the conference call. Location-based presence services also can specify the relative proximity of the participant (e.g., 28) relative to the meeting interface devices 20b or 20c, and also can specify whether a nonparticipant enters the participant's office, indicating that the nonparticipant may be interrupting the participant and engaging in a conversation with the participant.

The web conferencing circuit 72 also can receive additional monitoring information within the web-based interface 32, for example audio monitoring 96 that identifies whether the participant is speaking on the conference call, or whether the participant has used the web-based interface 32 to activate the audio, mute the audio, or increase or decrease the volume of the audio. The IP gateway 60 also can identify to the WC 72 if a call is disconnected or reconnected. If a video device is present at the participant's location, video data 98 also can be supplied to the web conference circuit 72 from the video integration circuit 64, either in the form of image recognition results or determined focus of attention parameters from detected in visual cues such as eye movement, head position, etc., or in the form of the raw image data which can be sent by the web conferencing circuit 72 to an appropriate analysis circuit.

In response to the web conferencing circuit 72 receiving in step 90 the monitoring data (e.g., focus of attention cues) as illustrated in FIG. 7, as well as the presence information, the web conferencing circuit 72 supplies the monitoring data to the meeting attention tracker and reporter circuit 70. The meeting attention tracker and reporter attention circuit 70 determines in step 90 the attention levels for individual participants and an aggregate attention metric for the identified meeting participants, and can generate and output in step 92 the real time focus of attention reports to the meeting presenter 26. Post-meeting reports also can be generated and stored by the meeting attention tracker and reporter circuit 70 in step 94, where the post-meeting reports can be generated in place of the real-time focus of attention reports, or in addition to the real-time focus of attention reports. For example, post-meeting reports can be generated that correlate individual and/or aggregate attention levels to the presentation data provided by a presenter, such as attention levels overlying a presentation slide, where each presentation slide is scored as having a corresponding aggregate attention level, or a graph illustrating the aggregate attention levels (y-axis) relative to the presenter's recorded speech over time (x-axis).

FIG. 5 illustrates an example method by the meeting attention tracker circuit 70 of generating individual participant focus of attention metrics according to an example embodiment. The meeting attention tracker circuit 70 can receive in step 100 the current focus of attention cues (i.e., monitoring data) as illustrated in FIG. 7 from either the participant device monitors (e.g., 40, 42), the presence server 14, or another server such as the Voice over IP gateway 24.

The meeting attention tracker circuit 70 can access in step 102 the participant recorded attention level and the relevant recorded focus of attention cues from the last processing cycle by the circuit 70 for the corresponding participant. The stored information in terms of the recorded attention level (RAL) and the recorded focus of attention (FOA) cues can be stored in multiple forms, for example an aggregated set where the metric information is accumulated over time, a dynamic (real-time) time decaying set, where the impact of prior activities relevant to current cues are directly affected by the amount of time difference in between prior activities and current activities; a recorded time-decaying set stores over time the values of time-varying parameters for subsequent analysis. In other words, a dynamic (real-time) time decaying set refers to activities that have a prescribed decay function and that are no longer detectable after sufficient decay; in contrast, a recorded time-decaying set refers to activities that have a prescribed decay function but that are recorded, enabling historical analysis of the activities despite the decay.

The recorded attention level (RAL) and the recorded focus of attention (FOA) cues retrieved in step 102 are compared by the meeting attention tracker circuit 70 in step 104 with the current focus of attention cues to determine the weighting that should be applied for major cues. For example, certain FOA cues can logically be considered to be major cues that provide a greater weight (i.e., a greater value) for determining the current focus of attention, for example in the case where a participant begins sending an instant message to another participant on a relevant topic, followed by performing a web search for the same topic. Hence, the nature of the user activity, as well as the temporal proximity of that activity to other related activities can determine the relevance of the focus of attention cues, as well as the relative importance of those focus of attention cues relative to the participants recorded attention level and previously recorded focus of attention cues.

The meeting attention tracker circuit 70 updates in step 106 the participant recorded attention level (RAL) and focus of attention (FOA) cues, and stores the RAL and FOA values for the corresponding meeting participant in an accessible memory circuit. The meeting attention tracker circuit 70 can output in step 108 the RAL and FOA cues to the meeting presenter 26 via the web-based interface 32, for example in the form of the focus of attention report 50 illustrated in FIG. 2, depending on the level of detail preferred by the presenter 26. If desired, the participant list 56 also can be grouped by attention level, described in further detail below. In addition, privacy options can be implemented, for example in the case where participants do not want their attention-metric data tied to their identity; in this case, a privacy option that provides anonymity can be implemented such that attention metrics are not published until the audience size reaches a prescribed threshold, after which the attention metrics are aggregated to provide an overall attention level 52.

FIG. 6 is a diagram illustrating an example method by the meeting attention tracker circuit 70 in generating an aggregate attention metric 52, according to an example embodiment. The meeting attention tracker circuit 70 receives or retrieves in step 110 the recorded attention levels, described above with respect to step 108 of FIG. 5, for all the meeting participants, and generates in step 112 an aggregate meeting attention level 52 from the recorded attention levels of the individual meeting participants. The meeting attention tracker circuit 70 outputs in step 114 the aggregate meeting attention level 52 for display on the presenter's web-based interface 32 as the focus of attention report 50. If the meeting attention tracker circuit 70 identifies in step 116 an identifiable group of participants that together engage in a secondary activity, and if in step 118 that secondary activity is established by the meeting attention tracker circuit 70 as relevant to the meeting, the meeting attention tracker circuit 70 can separately classify this group as a high focus of attention group, and separately display this high focus of attention group to the presenter meeting window 32 or within the focus of attention report 50. However, if the meeting attention tracker circuit 70 determines the secondary activity is not relevant to the meeting in step 118, the meeting attention tracker circuit 70 can classify in step 122 the group as a low focus of attention group, and add the low focus of attention group to the presenter meeting window 32 or the focus of attention report 50 displayed in the presenters meeting window 36.

According to the disclosed embodiments, user attention level during the course of a rich media conference can be tracked, enabling a presenter in real time to determine the participant attention level, without the necessity of visually observing the meeting participants. Hence, verbal and ad hoc requests for user feedback on participant interest is no longer necessary, since the disclosed embodiments can automatically determine a participant focus of attention, for each meeting participant, based on detecting and tracking the participant actions as the participant interacts with his or her user devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   establishing, by an Internet Protocol (IP)-based meeting server via an IP network, a web-based media conference between an identified meeting presenter having a web-enabled presenter client device and identified meeting participants each having at least one corresponding participating client device, at least one of the identified meeting participants participating in the web-based media conference based on concurrent use of the corresponding at least one participating client device and a corresponding second client device of the at least one identified meeting participant, wherein the establishing includes, for the at least one identified meeting participant:

establishing a first IP connection via the IP network with the at least one corresponding participating client device for the at least one identified meeting participant;

establishing a second IP connection via the IP network, concurrent with the first IP connection, with the second client device of the at least one identified meeting participant; and associating the first IP connection and the second IP connection, and the respective at least one corresponding participating client device and the second client device, with the at least one identified meeting participant;

receiving, by the IP-based meeting server, monitoring data for each of the identified meeting participants, the monitoring data including, for each identified meeting participant, a detected interaction by the corresponding identified meeting participant with the corresponding participant client device, the monitoring data for the at least one identified meeting participant based on the detected interactions of the at least one identified meeting participant with the at least one corresponding participating client device and the second device via the first and second IP connections, respectively;

generating, by the IP-based meeting server, an aggregate attention metric identifying an aggregate focus of attention by the identified meeting participants, based on the received monitoring data, the generating including determining, from a first of the monitoring data, whether an activity outside the media conference by one of the identified meeting participants is relevant to the media conference; and outputting, by the IP-based meeting server, the aggregate attention metric for display by the web-enabled presenter client device of the identified meeting presenter.

2. The method of claim 1, wherein:

the receiving includes receiving the monitoring data for the identified meeting participants from at least one of the corresponding participating client device or a second server; and the generating including generating the aggregate attention metric based on determining a corresponding participant focus of attention metric for each corresponding identified meeting participant based on the corresponding monitoring data.

3. The method of claim 2, wherein the second server is a presence server, the monitoring data from the presence server including presence information related to the corresponding identified meeting participant, the presence information including at least one of a status of a presence-based communication session executed via the corresponding participating client device, a status of a second client device associated with the corresponding identified meeting participant, a first location of the corresponding identified meeting participant relative to the corresponding participating client device, or a second location of a non-participant relative to the first location.

4. The method of claim 2, wherein the monitoring data from the corresponding participating client device includes at least one of an identified active application window, detected input parameters within the web-based media conference, detected keyboard inputs, detected selection device inputs, or detected web requests.

5. The method of claim 4, wherein the detected input parameters within the web-based media conference include at least one of audio control inputs, speech input, or text input.

6. The method of claim 2, wherein the outputting includes supplying the corresponding participant focus of attention metric for each corresponding identified meeting participant for display by the web-enabled presenter client device.

7. An apparatus comprising:

a web conference interface circuit configured for establishing a web-based media conference between an identified meeting presenter having a web-enabled presenter client device and identified meeting participants each having at least one corresponding participating client device, at least one of the identified meeting participants participating in the web-based media conference based on concurrent use of the corresponding at least one participating client device and a corresponding second client device of the at least one identified meeting participant, the web conference interface circuit configured for receiving, via an IP network, monitoring data for each of the identified meeting participants, the monitoring data including, for each identified meeting participant, a detected interaction by the corresponding identified meeting participant with the corresponding participant client device, including monitoring data for the second client device of the at least one identified meeting participant; and a calculation circuit configured for calculating an aggregate attention metric identifying an aggregate focus of attention by the identified meeting participants, based on the received monitoring data, including determining, from a first of the monitoring data, whether an activity outside the media conference by one of the identified meeting participants is relevant to the media conference;

the web conference interface circuit configured for outputting the aggregate attention metric for display by the web-enabled presenter client device of the identified meeting presenter;

the web conference interface circuit further configured for establishing, for the at least one identified meeting participant, a first IP connection via the IP network with the at least one corresponding participating client device for the at least one identified meeting participant, and a second IP connection via the IP network concurrent with the first IP connection with the second client device of the at least one identified meeting participant;

the web conference interface circuit further configured for associating the first IP connection and the second IP connection, and the respective at least one corresponding participating client device and the second client device, with the at least one identified meeting participant, the monitoring data for the at least one identified meeting participant based on the detected interactions of the at least one identified meeting participant with the at least one corresponding participating client device and the second device via the first and second IP connections, respectively.

8. The apparatus of claim 7, wherein:

the web conference interface circuit is configured for receiving the monitoring data for the identified meeting participants from at least one of the corresponding participating client device or a second server; and the calculation circuit configured for generating the aggregate attention metric based on determining a corresponding participant focus of attention metric for each corresponding identified meeting participant based on the corresponding monitoring data.

9. The apparatus of claim 8, wherein the second server is a presence server, the monitoring data from the presence server including presence information related to the corresponding identified meeting participant, the presence information including at least one of a status of a presence-based communication session executed via the corresponding participating client device, a status of a second client device associated with the corresponding identified meeting participant, a first location of the corresponding identified meeting participant relative to the corresponding participating client device, or a second location of a non-participant relative to the first location.

10. The apparatus of claim 8, wherein the monitoring data from the corresponding participating client device includes at least one of an identified active application window, detected input parameters within the web-based media conference, detected keyboard inputs, detected selection device inputs, or detected web requests.

11. The apparatus of claim 10, wherein the detected input parameters within the web-based media conference include at least one of audio control inputs, speech input, or text input.

12. The apparatus of claim 8, wherein the web conference interface circuit is configured for supplying the corresponding participant focus of attention metric for each corresponding identified meeting participant for display by the web-enabled presenter client device.

13. A method comprising:
   initiating, by a web-enabled presenter client device via an Internet Protocol (IP) network, a web-based media conference between a meeting presenter interacting with the web-enabled presenter client device and identified meeting participants each having at least one corresponding participating client device, based on the web-enabled web presenter client device establishing an IP connection via the IP network with an IP-based meeting server that establishes respective IP connections via the IP network with the respective participating client devices, at least one of the identified meeting participants participating in the web-based media conference based on association of a concurrent use of the corresponding at least one participating client device and a corresponding second client device by the at least one identified meeting participant;
   supplying, by the web-enabled presenter client device, media data from the meeting presenter to the IP-based meeting server for distribution to the participating client devices via the IP network during the web-based rich media conference, the participating client devices including the second client device of the at least one identified meeting participant; and
   displaying for the meeting presenter, by the web-enabled presenter client device, an aggregate attention metric received from the IP-based meeting server, the aggregate attention metric identifying an aggregate focus of attention by the identified meeting participants, the aggregate attention metric based on the association of the concurrent use for the meeting of the corresponding at least one participating client device and the corresponding second client device by the at least one identified meeting participant, the aggregate attention metric further based on a determination of whether an activity outside the media conference by one of the identified meeting participants is relevant to the web-based media conference.

14. The method of claim 13, wherein the displaying includes displaying participant focus of attention metrics, received from the IP-based meeting server, for the respective identified meeting participants.

15. An apparatus comprising:
   an Internet Protocol (IP) interface circuit configured for establishing an IP connection with an IP-based meeting server via an IP network; and
   a client interface circuit configured for initiating a web-based media conference between a meeting presenter interacting with the apparatus and identified meeting participants each having at least one corresponding participating client device, based on sending a request to the IP-based meeting server via the IP network to establish respective IP connections via the IP network with the respective participating client devices, at least one of the identified meeting participants participating in the web-based media conference based on association of a concurrent use of the corresponding at least one participating client device and a corresponding second client device by the at least one identified meeting participant;
   the client interface circuit configured for supplying media data from the meeting presenter to the IP-based meeting server for distribution to the participating client devices during the web-based media conference, and displaying for the meeting presenter an aggregate attention metric received from the IP-based meeting server, the aggregate attention metric identifying an aggregate focus of attention by the identified meeting participants, the participating client devices including the second client device of the at least one identified meeting participant, the aggregate attention metric based on the association of the concurrent use for the meeting of the corresponding at least one participating client device and the corresponding second client device by the at least one identified meeting participant, the aggregate attention metric further based on a determination of whether an activity outside the media conference by one of the identified meeting participants is relevant to the web-based media conference.

16. The apparatus of claim 15, wherein the client interface circuit is configured for displaying participant focus of attention metrics, received from the IP-based meeting server, for the respective identified meeting participants.

17. An apparatus comprising:
   means for establishing a web-based media conference between an identified meeting presenter having a web-enabled presenter client device and identified meeting participants each having at least one corresponding participating client device, at least one of the identified meeting participants participating in the web-based media conference based on concurrent use of the corresponding at least one participating client device and a corresponding second client device of the at least one identified meeting participant, the means for establishing configured for receiving, via an IP network, monitoring data for each of the identified meeting participants, the monitoring data including, for each identified meeting participant, a detected interaction by the corresponding identified meeting participant with the corresponding participant client device, including monitoring data for the second client device of the at least one identified meeting participant; and
   means for calculating an aggregate attention metric identifying an aggregate focus of attention by the identified meeting participants, based on the received monitoring data, including determining, from a first of the monitoring data, whether an activity outside the media conference by one of the identified meeting participants is relevant to the media conference;
   the means for establishing configured for outputting the aggregate attention metric for display by the web-enabled presenter client device of the identified meeting presenter;

the means for establishing further configured for establishing, for the at least one identified meeting participant, a first IP connection via the IP network with the at least one corresponding participating client device for the at least one identified meeting participant, and a second IP connection via the IP network concurrent with the first IP connection with the second client device of the at least one identified meeting participant;

the means for establishing further configured for associating the first IP connection and the second IP connection, and the respective at least one corresponding participating client device and the second client device, with the at least one identified meeting participant, the monitoring data for the at least one identified meeting participant based on the detected interactions of the at least one identified meeting participant with the at least one corresponding participating client device and the second device via the first and second IP connections, respectively.

18. An apparatus comprising:

means for establishing an Internet Protocol (IP) connection with an IP-based meeting server via an IP network; and means for initiating a web-based media conference between a meeting presenter interacting with the apparatus and identified meeting participants each having at least one corresponding participating client device, based on sending a request to the IP-based meeting server via the IP network to establish respective IP connections via the IP network with the respective participating client devices, at least one of the identified meeting participants participating in the web-based media conference based on association of a concurrent use of the corresponding at least one participating client device and a corresponding second client device by the at least one identified meeting participant;

the means for initiating configured for supplying media data from the meeting presenter to the IP-based meeting server for distribution to the participating client devices during the web-based media conference, and displaying for the meeting presenter an aggregate attention metric received from the IP-based meeting server, the aggregate attention metric identifying an aggregate focus of attention by the identified meeting participants, the participating client devices including the second client device of the at least one identified meeting participant, the aggregate attention metric based on the association of the concurrent use for the meeting of the corresponding at least one participating client device and the corresponding second client device by the at least one identified meeting participant, the aggregate attention metric further based on a determination of whether an activity outside the media conference by one of the identified meeting participants is relevant to the web-based media conference.

* * * * *